(12) United States Patent
Shiozaki et al.

(10) Patent No.: US 10,370,542 B2
(45) Date of Patent: Aug. 6, 2019

(54) THERMOSETTING POWDER COATING MATERIAL AND COATED PRODUCT

(71) Applicant: FUJI XEROX CO., LTD., Tokyo (JP)

(72) Inventors: Hirofumi Shiozaki, Kanagawa (JP); Susumu Yoshino, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 17 days.

(21) Appl. No.: 15/714,213

(22) Filed: Sep. 25, 2017

(65) Prior Publication Data

US 2018/0273768 A1   Sep. 27, 2018

(30) Foreign Application Priority Data

Mar. 21, 2017   (JP) ................. 2017-054606

(51) Int. Cl.
| | | |
|---|---|---|
| C08G 63/02 | (2006.01) |
| C09D 5/03 | (2006.01) |
| C09D 167/02 | (2006.01) |
| C09D 167/04 | (2006.01) |
| C09D 133/08 | (2006.01) |
| C08K 5/00 | (2006.01) |
| C09D 133/10 | (2006.01) |
| C08G 18/80 | (2006.01) |
| C09D 175/06 | (2006.01) |
| C08G 18/42 | (2006.01) |
| C08J 5/18 | (2006.01) |

(52) U.S. Cl.
CPC .......... *C09D 5/031* (2013.01); *C08G 18/4247* (2013.01); *C08G 18/80* (2013.01); *C08K 5/0025* (2013.01); *C09D 133/08* (2013.01); *C09D 133/10* (2013.01); *C09D 167/02* (2013.01); *C09D 167/025* (2013.01); *C09D 167/04* (2013.01); *C09D 175/06* (2013.01); *B05D 2401/32* (2013.01); *B05D 2502/005* (2013.01); *B05D 2518/00* (2013.01); *C08G 2150/20* (2013.01); *C08J 5/18* (2013.01)

(58) Field of Classification Search
USPC ................................................. 528/271, 272
See application file for complete search history.

(56) References Cited

FOREIGN PATENT DOCUMENTS

| | | |
|---|---|---|
| JP | 2001-070873 A | 3/2001 |
| JP | 2001-152082 A | 6/2001 |
| JP | 2001-220544 A | 8/2001 |

*Primary Examiner* — Terressa Boykin
(74) *Attorney, Agent, or Firm* — Sughrue Mion, PLLC

(57) ABSTRACT

A thermosetting powder coating material includes powder particles containing a thermosetting resin, a thermosetting agent, and a surfactant. The amount of the surfactant is about 0.1 ppm or more and about 8.0 ppm or less on a mass basis.

20 Claims, No Drawings

THERMOSETTING POWDER COATING MATERIAL AND COATED PRODUCT

CROSS-REFERENCE TO RELATED APPLICATIONS

This application is based on and claims priority under 35 USC 119 from Japanese Patent Application No. 2017-054606 filed Mar. 21, 2017.

BACKGROUND (i) Technical Field

The present invention relates to a thermosetting powder coating material and a coated product.

(ii) Related Art

Electrostatic coating of powder coating materials has attracted attention in terms of global environment conservation because such electrostatic coating releases small amounts of volatile organic compounds (VOCs) and powder coating materials that remain unattached to target objects can be collected and recycled.

SUMMARY

According to an aspect of the invention, there is provided a thermosetting powder coating material including powder particles containing a thermosetting resin, a thermosetting agent, and a surfactant. The amount of the surfactant is about 0.1 ppm or more and about 8.0 ppm or less on a mass basis.

DETAILED DESCRIPTION

Exemplary embodiments of the present invention will be described below. The following description and Examples are provided to illustrate exemplary embodiments of the present invention but are not intended to limit the scope of the present invention.

In the present disclosure, the amount of each component in the composition refers to, when there are several substances corresponding to the component in the composition, the total amount of the substances present in the composition, unless otherwise specified.

In the present disclosure, the term "step" not only includes an independent step but also includes a step that cannot be clearly distinguished from other steps but may accomplish an intended purpose.

In the present disclosure, the term "thermosetting powder coating material" may also be referred simply as a "powder coating material".

In the present disclosure, the unit "ppm" is an acronym of "parts per million".

Thermosetting Powder Coating Material

A powder coating material according to an exemplary embodiment includes powder particles containing a thermosetting resin, a thermosetting agent, and a surfactant. The amount of the surfactant relative to the total amount of the powder particles is about 0.1 ppm or more and about 8.0 ppm or less on a mass basis.

The amount of the surfactant in the powder particles is determined by high performance liquid chromatography (HPLC) that involves dissolving the powder particles in tetrahydrofuran. When the surfactant is unknown, the molecular structures of unknown components fractionated with an HPLC apparatus are determined by analysis using nuclear magnetic resonance (NMR) and a component having a hydrophilic group and a hydrophobic group is determined to be a surfactant.

Examples of the method for controlling the amount of the surfactant in the powder particles include, in production of the powder particles by a wet method, 1) controlling the type or the amount of surfactant used for dispersing or emulsifying the thermosetting resin and 2) washing the powder particles with water and controlling the number of times of washing.

The powder coating material according to an exemplary embodiment may be either a transparent powder coating material (clear coating material) in which powder particles are free of a colorant, or a colored powder coating material in which powder particles contain a colorant.

The powder coating material according to an exemplary embodiment contains powder particles and may further contain an external additive to be attached to the surfaces of the powder particles. The powder coating material according to an exemplary embodiment may contain an external additive to be attached to the surfaces of the powder particles in order to increase fluidity.

Powder Particles

The structure of each powder particle is not limited. The powder particle may be a powder particle having a single layer structure or may be a powder particle having a core and a resin coating that covers the core, which is what is called a core shell structure.

The materials, composition, physical properties, and the like of the powder particles will be described below.

Thermosetting Resin

The thermosetting resin is a resin having a thermosetting reaction group. Examples of the thermosetting resin include various thermosetting resins that have been used for powder particles of powder coating materials.

The thermosetting resin may be a water-insoluble (hydrophobic) resin. The use of a water-insoluble (hydrophobic) resin as the thermosetting resin reduces the environmental dependency of the charging characteristics of the powder coating material (powder particles). When the powder particles are produced by an aggregation and coalescence process, the thermosetting resin may be a water-insoluble (hydrophobic) resin in order to achieve emulsion dispersion in an aqueous medium. The term "water-insoluble (hydrophobic)" means that the amount of a target substance dissolved in 100 parts by mass of water at 25° C. is less than 5 parts by mass.

The thermosetting resin may be at least one selected from the group consisting of thermosetting polyester resins and thermosetting (meth)acrylic resins.

The thermosetting resin may be a thermosetting polyester resin because thermosetting polyester resins have higher affinity to surfactants than thermosetting (meth)acrylic resins and the powder particles more easily take a surfactant in during production of the powder particles by a wet method.

Thermosetting Polyester Resin

A thermosetting polyester resin is, for example, a polycondensate prepared by polycondensation of at least a polybasic acid and a polyalcohol. Introduction of a thermosetting reaction group to the thermosetting polyester resin is carried out by controlling the amounts of the polybasic acid and the polyalcohol. This control provides a thermosetting polyester resin having at least one of a carboxyl group and a hydroxyl group as a thermosetting reaction group.

Examples of the polybasic acid include terephthalic acid, isophthalic acid, phthalic acid, methylterephthalic acid, trimellitic acid, pyromellitic acid, and anhydrides of these acids; succinic acid, adipic acid, azelaic acid, sebacic acid, and anhydrides of these acids; maleic acid, itaconic acid, and anhydrides of these acids; fumaric acid, tetrahydrophthalic acid, methyltetrahydrophthalic acid, hexahydrophthalic acid, methylhexahydrophthalic acid, and anhydrides of these acids; and cyclohexanedicarboxylic acid, and 2,6-naphthalenedicarboxylic acid.

Examples of the polyalcohol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis(hydroxyethyl) terephthalate, cyclohexane dimethanol, octanediol, diethyl propanediol, butyl ethyl propanediol, 2-methyl-1,3-propanediol, 2,2,4-trimethyl pentanediol, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol, tris(hydroxyethyl) isocyanurate, and hydroxy pivalyl hydroxy pivalate.

The thermosetting polyester resin may be a polycondensate containing other monomers except for polybasic acids and polyalcohols. Examples of other monomers include compounds having both a carboxyl group and a hydroxyl group in one molecule (e.g., dimethanol propionic acid and hydroxy pivalate); mono-epoxy compounds (e.g., glycidyl esters of branched aliphatic carboxylic acids, such as "Cardura E10 (Shell Chemicals)"; various monohydric alcohols (e.g., methanol, propanol, butanol, and benzyl alcohol); various monobasic acids (e.g., benzoic acid and p-tert-butyl benzoic acid); and various fatty acids (e.g., castor oil fatty acid, palm oil fatty acid, and soybean oil fatty acid).

The thermosetting polyester resin may have a branched structure or a linear structure.

To improve the flatness and smoothness of a coating film formed of the thermosetting polyester resin, the sum of the acid value and the hydroxyl value may be about 10 mg KOH/g or more and about 250 mg KOH/g or less, and the number-average molecular weight may be about 1,000 or more and about 100,000 or less.

The acid value and the hydroxyl value of the thermosetting polyester resin are determined in accordance with JIS K0070-1992. The molecular weight of the thermosetting polyester resin is determined by gel permeation chromatography (GPC). To determinate the molecular weight by GPC, HLC-8120GPC (Tosoh Corporation) is used as a measurement device, TSKgel SuperHM-M (15 cm) (Tosoh Corporation) as a column, and tetrahydrofuran as a solvent. The weight-average molecular weight and the number-average molecular weight are calculated from the molecular weight calibration curve created by using a monodisperse polystyrene standard based on the obtained measurement results.

Thermosetting (Meth)Acrylic Resin

The thermosetting (meth)acrylic resin is a (meth)acrylic resin having a thermosetting reaction group. Introduction of a thermosetting reaction group to the thermosetting (meth) acrylic resin may be carried out by using a vinyl monomer having a thermosetting reaction group. The vinyl monomer having a thermosetting reaction group may be a (meth) acrylic monomer (a monomer having a (meth)acryloyl group) or may be a vinyl monomer other than a (meth) acrylic monomer.

Examples of the thermosetting reaction group of the thermosetting (meth)acrylic resin include an epoxy group, a carboxyl group, a hydroxyl group, an amide group, an amino group, an acid anhydride group, and a (block) isocyanate group. Among these groups, the thermosetting reaction group of the (meth)acrylic resin may be at least one selected from the group consisting of an epoxy group, a carboxyl group, and a hydroxyl group in order to facilitate production of the (meth)acrylic resin. At least one of the thermosetting reaction group may be an epoxy group in order to improve the storage stability of the powder coating material and the coating film appearance.

Examples of the vinyl monomer having an epoxy group as a thermosetting reaction group include various chain epoxy group-containing monomers (e.g., glycidyl (meth)acrylate, β-methyl glycidyl (meth)acrylate, glycidyl vinyl ether, and allyl glycidyl ether), various (2-oxo-1,3-dioxolane) group-containing vinyl monomers (e.g., (2-oxo-1,3-dioxolane) methyl (meth)acrylate), and various alicyclic epoxy group-containing vinyl monomers (e.g., 3,4-epoxycyclohexyl (meth)acrylate, 3,4-epoxycyclohexylmethyl (meth)acrylate, and 3,4-epoxycyclohexylethyl (meth)acrylate).

Examples of the vinyl monomer having a carboxyl group as a thermosetting reaction group include various carboxyl group-containing monomers (e.g., (meth)acrylic acid, crotonic acid, itaconic acid, maleic acid, and fumaric acid), various monoesters of α,β-unsaturated dicarboxylic acid and monohydric alcohols having 1 to 18 carbon atoms (e.g., monomethyl fumarate, monoethyl fumarate, monobutyl fumarate, monoisobutyl fumarate, mono-tert-butyl fumarate, monohexyl fumarate, monooctyl fumarate, mono-2-ethylhexyl fumarate, monomethyl maleate, monoethyl maleate, monobutyl maleate, monoisobutyl maleate, mono-tert-butyl maleate, monohexyl maleate, monooctyl maleate, and mono-2-ethylhexyl maleate), and various monoalkyl itaconates (e.g., monomethyl itaconate, monoethyl itaconate, monobutyl itaconate, monoisobutyl itaconate, monohexyl itaconate, monooctyl itaconate, and mono-2-ethylhexyl itaconate).

Examples of the vinyl monomer having a hydroxyl group as a thermosetting reaction group include various hydroxyl group-containing (meth)acrylates (e.g., 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate), addition reaction products between these various hydroxyl group-containing (meth)acrylates and ε-caprolactone, various hydroxyl group-containing vinyl ethers (e.g., 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), addition reaction products between these various hydroxyl group-containing vinyl ethers and ε-caprolactone, various hydroxyl group-containing allyl ethers (e.g., 2-hydroxyethyl (meth) allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), and addition reaction products of these various hydroxyl group-containing allyl ethers and ε-caprolactone.

Examples of the (meth)acrylic monomer without a thermosetting reaction group, which is a structural unit of the thermosetting (meth)acrylic resin, include alkyl (meth)acrylates (e.g., methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate, and stearyl (meth)acrylate); various aryl (meth)acrylates (e.g., benzyl (meth)acrylate, phenyl (meth)acrylate, phenoxyethyl (meth)acrylate); various alkyl carbitol (meth) acrylates (e.g., ethyl carbitol (meth)acrylate); various (meth) acrylates (e.g., isobornyl (meth)acrylate, dicyclopentanyl (meth)acrylate, dicyclopentenyl (meth)acrylate, dicyclopentenyloxyethyl (meth)acrylate, tetrahydrofurfuryl (meth) acrylate); various amino group-containing amide unsaturated monomers (e.g., N-dimethylaminoethyl (meth) acrylamide, N-diethylaminoethyl (meth)acrylamide, N-dimethylaminopropyl (meth)acrylate, and N-diethylaminopropyl (meth)acrylamide); various dialkylaminoalkyl (meth)acrylates (e.g., dimethylaminoethyl (meth)acrylate, and diethylaminoethyl (meth)acrylate); and various amino group-containing monomers (e.g., tert-butylaminoethyl (meth)acrylate, tert-butylaminopropyl (meth)acrylate, aziridinylethyl (meth)acrylate, pyrrolidinylethyl (meth) acrylate, and piperidinylethyl (meth)acrylate).

The thermosetting (meth)acrylic resin may contain other vinyl monomers without a thermosetting reaction group in addition to the (meth)acrylic monomer. Examples of other vinyl monomers include various α-olefins (e.g., ethylene, propylene, and butene-1), various halogenated olefins except for fluoroolefin (e.g., vinyl chloride and vinylidene chloride), various aromatic vinyl monomers (e.g., styrene, α-methylstyrene, and vinyltoluene), various diesters of unsaturated dicarboxylic acids and monohydric alcohols having 1 to 18 carbon atoms (e.g., dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (e.g., maleic acid anhydride, itaconic acid anhydride, citraconic acid anhydride, (meth) acrylic acid anhydride, and tetrahydrophthalic acid anhydride), various phosphoester group-containing monomers (e.g., diethyl-2-(meth)acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (e.g., γ-(meth)acryloyloxypropyl trimethoxysilane, γ-(meth)acryloyloxypropyl triethoxysilane, and γ-(meth)acryloyloxypropylmethyl dimethoxysilane), various aliphatic vinyl carboxylates (e.g., vinyl acetate, vinyl propionate, vinyl butyrate, vinyl isobutyrate, vinyl caproate, vinyl caprylate, vinyl caprate, vinyl laurate, branched aliphatic vinyl carboxylates having 9 to 11 carbon atoms, and vinyl stearate), and various vinyl esters of carboxylic acids having a cyclic structure (e.g., vinyl cyclohexanecarboxylate, vinyl methylcyclohexanecarboxylate, vinyl benzoate, and vinyl p-tert-butylbenzoate).

The number-average molecular weight of the thermosetting (meth)acrylic resin is preferably about 1,000 or more and about 20,000 or less, and more preferably about 1,500 or more and about 15,000 or less in order to improve the flatness and smoothness of a coating film. The molecular weight of the thermosetting (meth)acrylic resin is measured by the same method as that for the thermosetting polyester resin.

The glass transition temperature (Tg) of the thermosetting resin is preferably about 60° C. or lower and more preferably about 55° C. or lower in order to improve the flatness and smoothness of a coating film even when the thermosetting resin is baked at a low temperature. The glass transition temperature (Tg) of the thermosetting resin is obtained from the differential scanning calorimetry (DSC) curve created by differential scanning calorimetry (DSC). Specifically, the glass transition temperature (Tg) is determined based on "extrapolated onset glass transition temperature" described in the method for determining the glass transition temperature in accordance with JIS K7121-1987 "Testing Methods for Transition Temperatures of Plastics".

The thermosetting resin may be used alone or in combination of two or more.

The amount of the thermosetting resin in the powder particles is preferably 20% by mass or more and 99% by mass or less, and more preferably 30% by mass or more and 95% by mass or less.

Other Resins

When the powder particles have a core-shell structure, the powder particle may contain a non-thermosetting resin in its core. The proportion of the non-thermosetting resin in the entire resin of the powder particle is preferably about 5% by mass or less, more preferably about 1% by mass or less, and still more preferably substantially 0% in order to improve the curing density (crosslinking density) of a coating film. In other words, the resin in the powder particle may be composed only of a thermosetting resin. The non-thermosetting resin may be at least one selected from the group consisting of (meth)acrylic resins and polyester resins.

Thermosetting Agent

The thermosetting agent is selected according to the type of thermosetting reaction group of the thermosetting resin.

When the thermosetting reaction group of the thermosetting resin is a hydroxyl group, examples of the thermosetting agent include blocked isocyanates and aminoplast. Examples of isocyanate compounds that form blocked isocyanates include organic diisocyanates, polymers of organic diisocyanates (including isocyanurate-type polyisocyanate compounds), polyalcohol adducts of organic diisocyanates, low-molecular-weight polyester resin (e.g., polyester polyol) adducts of organic diisocyanates, and water adducts of organic diisocyanates. Examples of organic diisocyanates include various aliphatic diisocyanates (e.g., hexamethylene diisocyanate and trimethyl hexamethylene diisocyanate), various cyclic aliphatic diisocyanates (e.g., xylylene diisocyanate and isophorone diisocyanate), and various aromatic diisocyanates (e.g., tolylene diisocyanate and 4,4'-diphenylmethane diisocyanate). Examples of blocking agents for the isocyanate group include oxime compounds, such as formaldoxime, acetaldoxime, acetoxime, methyl ethyl ketoxime, methyl isobutyl ketoxime, and cyclohexanone oxime.

When the thermosetting reaction group of the thermosetting resin is a carboxyl group, examples of thermosetting agents include various epoxy resins (e.g., bisphenol A polydiglycidyl ether), epoxy group-containing acrylic resins (e.g., glycidyl group-containing acrylic resins), polyglycidyl ethers of various polyalcohols (e.g., 1,6-hexanediol, trimethylolpropane, and trimethylolethane), polyglycidyl esters of various polyvalent carboxylic acids (e.g., phthalic acid, terephthalic acid, isophthalic acid, hexahydrophthalic acid, methylhexahydrophthalic acid, trimellitic acid, and pyromellitic acid), various alicyclic epoxy group-containing compounds (e.g., bis(3,4-epoxycyclohexyl)methyl adipate), and hydroxyamides (e.g., triglycidyl isocyanurate and β-hydroxy alkylamide).

These thermosetting agents may be used alone or in combination of two or more.

The amount of the thermosetting agent in the powder particles is preferably about 1% by mass or more and about 30% by mass or less, and more preferably about 3% by mass or more and about 20% by mass or less relative to the amount of the thermosetting resin.

Surfactant

Examples of the surfactant include anionic surfactants, cationic surfactants, and nonionic surfactants. These surfactants may be used alone or in combination of two or more.

Examples of anionic surfactants include alkylbenzene sulfonates, such as sodium alkylbenzene sulfonate, potassium alkylbenzene sulfonate, and calcium alkylbenzene sulfonate; alkyl sulfates; alkyl ether sulfates; (mono)alkyl phosphates; α-olefin sulfonates; and alkane sulfonates.

Examples of nonionic surfactants include polyoxyethylene alkyl ethers, such as polyoxyethylene lauryl ether, polyoxyethylene stearyl ether, and polyoxyethylene oleyl ether; polyoxyethylene alkyl phenyl ethers; polyoxyethylene fatty acid esters; sorbitan fatty acid esters; and alkyl glycosides.

Examples of cationic surfactants may include alkyl trimethyl ammonium salts; dialkyl dimethyl ammonium salts; alkyl dimethyl benzylammonium salts; and N-methyl bis(hydroxyethyl)amine fatty acid ester hydrochloride.

The surfactant may be an anionic surfactant or a nonionic surfactant because such a surfactant has high affinity to polyester resins and is easily taken into powder particles containing a thermosetting polyester resin during production of the powder particles by a wet method.

The surfactant may be an anionic surfactant because such a surfactant facilitates release of charges from the powder particles and, as a result, suppresses electrostatic repulsion between the powder particles.

The amount (on a mass basis) of the surfactant in the powder particles is 0.1 ppm or more and 8.0 ppm or less, more preferably 1 ppm or more and 7 ppm or less, still more preferably 3 ppm or more and 7 ppm or less, yet still more preferably 3 ppm or more and 6 ppm or less, and yet still more preferably 3 ppm or more and 4 ppm or less in order to suppress formation of recesses in the coating film and obtain the heat-resistant storage stability of the powder particles.

Colorant

Examples of the colorant include pigments. The colorant may be a combination of a pigment and a dye. The colorant may be used alone or in combination of two or more.

Examples of the pigment include inorganic pigments, such as iron oxides (e.g., bengala), titanium oxide, titanium yellow, zinc oxide, white lead, zinc sulfide, lithopone, antimony oxide, cobalt blue, and carbon black; organic pigments, such as quinacridone red, phthalocyanine blue, phthalocyanine green, permanent red, Hansa yellow, indanthrene blue, brilliant fast scarlet, and benzimidazolone yellow; and bright pigments. Examples of bright pigments include metal powders, such as pearl pigments, aluminum powder, and stainless steel powder; metal flakes; glass beads; glass flakes; mica; and micaceous iron oxide (MIO).

The amount of the colorant is selected according to, for example, the type of pigment, and the hue, lightness, and depth required for the coating film. For example, the amount of the colorant is preferably 1% by mass or more and 70% by mass or less and more preferably 2% by mass or more and 60% by mass or less relative to the total amount of the resin in the powder particles.

Other Additives

Examples of other additives include various additives used for powder coating materials. Specific examples of other additives include surface conditioners (e.g., silicone oil and acrylic oligomer), foam inhibitors (e.g., benzoin and benzoin derivatives), curing accelerators (e.g., amine compounds, imidazole compounds, cationic polymerization catalysts), plasticizers, charge control agents, antioxidants, pigment dispersants, flame retardants, and fluidity-imparting agents.

Divalent or Higher-Valent Metal Ions

The powder particles may contain a divalent or higher-valent metal ion (hereinafter also referred to simply as a "metal ion"). The divalent or higher-valent metal ion interacts with carboxyl groups or hydroxyl groups of the resin in the powder particles to form ionic cross-links. These ionic cross-links suppress bleeding of various components to the surfaces of the powder particles and improve the storage stability of the powder coating material. Since these ionic cross-links are broken as a result of heating during thermal curing, the divalent or higher-valent metal ions, if present, do not increase the melt viscosity of the powder particles, which eliminates a concern that the coating film has poor flatness and smoothness.

Examples of the divalent or higher-valent metal ion include divalent to tetravalent metal ions. Specifically, the metal ion is, for example, at least one metal ion selected from the group consisting of an aluminum ion, a magnesium ion, an iron ion, a zinc ion, and a calcium ion.

Examples of metal ion sources (compounds to be added to the powder particles as an additive) include metal salts, inorganic metal salt polymers, and metal complexes. In an example, such a metal ion source is added to the powder particles as a flocculant when the powder particles are produced by an aggregation and coalescence process. In another example, such a metal ion source may be added to the powder particles as a catalyst for promoting the thermosetting reaction, or may be added for any purpose.

Examples of metal salts include aluminum sulfate, aluminum chloride, magnesium chloride, magnesium sulfate, iron(II) chloride, zinc chloride, calcium chloride, and calcium sulfate.

Examples of inorganic metal salt polymers include polyaluminum chloride, polyaluminum hydroxide, poly iron(II) sulfate, and calcium polysulfide.

Examples of metal complexes include metal salts of aminocarboxylic acid. Specific examples of metal complexes include metal salts (e.g., calcium salts, magnesium salts, iron salts, and aluminum salts) based on known chelating acids, such as ethylenediaminetetraacetic acid, propanediaminetetraacetic acid, nitrilotriacetic acid, triethylenetetraminehexaacetic acid, and diethylenetriaminepentaacetic acid.

Higher-valent metal ions are more preferable because they easily form a network of ionic cross-links and improve the storage stability of the powder coating material and the flatness and smoothness of the coating film. Because of these reasons, the metal ion is preferably an Al ion. Specifically, the metal ion source is preferably an aluminum salt (e.g., aluminum sulfate or aluminum chloride) or an aluminum salt polymer (e.g., polyaluminum chloride or polyaluminum hydroxide). When metal ions have the same valence, inorganic metal salt polymers are more preferable than metal salts among metal ion sources in order to improve the storage stability of the powder coating material and the flatness and smoothness of the coating film. Because of this, the metal ion source is still more preferably an aluminum salt polymer (e.g., polyaluminum chloride or polyaluminum hydroxide).

The amount of the metal ion is preferably 0.002% by mass or more and 0.2% by mass or less and more preferably 0.005% by mass or more and 0.15% by mass or less relative to the total amount of the powder particle in order to improve the storage stability of the powder coating material and the flatness and smoothness of the coating film. When the amount of the metal ion is 0.002% by mass or more, the metal ion appropriately forms ionic cross-links, which suppresses bleeding on the surface of the powder particles to improve the storage stability of the coating material. When the amount of the metal ion is 0.2% by mass or less, the metal ion does not form excessive ionic cross-links, which improves the flatness and smoothness of the coating film.

In the case of the production of the powder particles by an aggregation and coalescence process, the metal ion source (e.g., a metal salt, an inorganic metal salt polymer, or a metal complex) to be added as a flocculant contributes to control of the particle size distribution and the shape of the powder particles.

Specifically, higher-valent metal ions are more preferable because they provide a narrower particle size distribution. When metal ions have the same valence, inorganic metal salt polymers are more preferable than metal salts in order to obtain a narrow particle size distribution. From the foregoing viewpoints, the metal ion source is preferably an aluminum salt (e.g., aluminum sulfate or aluminum chloride) or an aluminum salt polymer (e.g., polyaluminum chloride or polyaluminum hydroxide) and more preferably an aluminum salt polymer (e.g., polyaluminum chloride or polyaluminum hydroxide).

When the flocculant is added such that the amount of the metal ion is 0.002% by mass or more, aggregation of the resin particles in an aqueous medium proceeds to realize a narrow particle size distribution. In addition, aggregation of the resin particles which will constitute a resin coating proceeds around the aggregated particles which will constitute a core. This aggregation contributes to formation of the resin coating around the entire surface of the core. When the flocculant is added such that the amount of the metal ion is 0.2% by mass or less, excessive formation of ionic cross-links in the aggregated particles is suppressed, and the produced powder particles tend to be close to spherical in shape in an aggregation and coalescence process. From the foregoing viewpoints, the amount of the metal ion is preferably 0.002% by mass or more and 0.2% by mass or less, and more preferably 0.005% by mass or more and 0.15% by mass or less.

Examples of the method for controlling the amount of the metal ion include 1) a method for controlling the amount of a metal ion source added, and 2), in the case of production of the powder particles by an aggregation and coalescence process, a method for controlling the amount of the metal ion involving, in an aggregation step, adding a flocculant (e.g., a metal salt or an inorganic metal salt polymer) as a metal ion source, then adding a chelating agent (e.g., ethylenediaminetetraacetic acid (EDTA), diethylenetriamine pentaacetic acid (DTPA), or nitrilotriacetic acid (NTA)) at the end of the aggregation step to form a complex of the chelating agent and the metal ion, and removing the formed complex salt in the subsequent washing step or other steps.

Physical Properties of Powder Particles

The volume-average particle size D50v of the powder particles is preferably 3 μm or more and 10 μm or less, more preferably 4 μm or more and 10 μm or less, still more preferably 4 μm or more and 8 μm or less, and yet still more preferably 5 μm or more and 7 μm or less in order to improve evenness in the thickness of the coating film.

In the powder particles having a core shell structure, the coverage of the resin coating on the powder particle surface is, for example, 30% or more and 100% or less. The thickness of the resin coating is, for example, 0.2 μm or more and 4 μm or less.

The volume particle size distribution index GSDv of the powder particles is preferably about less than 1.20, more preferably about 1.19 or less, and still more preferably about 1.18 or less in order to improve the flatness and smoothness of the coating film.

The average circularity of the powder particles is preferably about 0.96 or more, more preferably about 0.97 or more, and still more preferably about 0.98 or more in order to improve the flatness and smoothness of the coating film.

The volume-average particle size D50v and the volume particle size distribution index GSDv of the powder particles are measured by using a Coulter Multisizer II (Beckman Coulter, Inc.) and ISOTON-II (Beckman Coulter, Inc.) which serves as an electrolyte. In the measurement, 0.5 mg to 50 mg of a target sample is added to 2 ml of an aqueous solution containing 5% by mass of a surfactant (may be sodium alkylbenzene sulfonate) as a dispersant. The resulting mixture is added to 100 ml to 150 ml of an electrolyte. The electrolyte in which the sample is suspended is subjected to a dispersion treatment using an ultrasonic disperser for 1 minute, and the particle size distribution of particles having a particle size from 2 μm to 60 μm is measured using a Coulter Multisizer II with an aperture having an aperture diameter of 100 μm. The number of particles to be sampled is 50,000. The volume-based cumulative distribution is drawn from the smaller particle size side for particle size ranges (channels) divided in accordance with the measured particle size distribution. The particle size at a cumulative percentage of 16% is defined as a volume particle size D16v, the particle size at a cumulative percentage of 50% as a volume-average particle size D50v, and the particle size at a cumulative percentage of 84% as a volume-average particle size D84v. The volume particle size distribution index GSDv is calculated as $(D84v/D16v)^{1/2}$.

The average circularity of the powder particles is measured by using a flow particle image analyzer (FPIA-3000 available from Sysmex Corporation). Specifically, 0.1 ml to 0.5 ml of a surfactant (alkylbenzene sulfonate) is added as a dispersant to 100 ml to 150 ml of water from which solid impurities have been removed in advance, and 0.1 g to 0.5 g of a target sample is added thereto. The suspension in which the target sample is dispersed is subjected to a dispersion treatment using an ultrasonic disperser for 1 minute to 3 minutes, and the concentration of the dispersion is adjusted to from 3,000 particles/μl to 10,000 particles/μl. The average circularity of the powder particles in this dispersion is measured using a flow particle image analyzer.

The average circularity of the powder particles is obtained according to the following formula after calculating the circularity (Ci) of n particles having a particle size of 2 μm or more and 60 μm or less. In the following formula, Ci represents a circularity (=the circumference of a circle having an area equal to the projected area of a particle/the circumference of the projected particle image), and fi represents a frequency of the particle.

$$\text{average circularity } (Ca) = \left( \sum_{i=1}^{n} (Ci \times fi) \right) \bigg/ \sum_{i=1}^{n} (fi) \qquad \text{[Equation 1]}$$

External Additive

The external additive prevents or reduces aggregation of the powder particles. The use of the external additive enables a coating film having high flatness and smoothness to be formed with a small amount of the powder coating material. Specific examples of the external additive include inorganic particles. Examples of inorganic particles include particles made of, for example, $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO.SiO_2$, $K_2O.(TiO_2)n$, $Al_2O_3.2SiO_2$, $CaCO_3$, $MgCO_3$, $BaSO_4$, and $MgSO_4$.

The surfaces of the inorganic particles serving as an external additive may be hydrophobized. Hydrophobization is performed by, for example, immersing the inorganic particles in a hydrophobizing agent. Examples of the hydrophobizing agent include, but are not limited to, a silane coupling agent, silane, silicone oil, a titanate coupling agent, and an aluminum coupling agent. These hydrophobizing agents may be used alone or in combination of two or more. The amount of the hydrophobizing agent is, for example, 1 part by mass or more and 10 parts by mass or less relative to 100 parts by mass of the inorganic particles.

The volume-average particle size of the external additive is preferably about 5 nm or more and about 40 nm or less and more preferably about 8 nm or more and about 30 nm or less. When the external additive having a volume-average particle size of about 5 nm or more and about 40 nm or less is used, the powder particles are easily broken down to primary particles by airflow during application of the powder coating material with a spray gun or the like, so that the powder particles may be attached to a target object as primary particles.

The amount of the external additive is preferably, for example, about 0.01% by mass or more and about 5% by mass or less and more preferably about 0.01% by mass or more and about 2.0% by mass or less relative to the amount of the powder particles.

Method for Producing Powder Coating Material

Next, a method for producing a powder coating material according to an exemplary embodiment will be described.

The powder coating material according to the exemplary embodiment is obtained by, as desired, adding an external additive to powder particles and, as desired, sizing the powder particles after production of the powder particles.

The powder particles may be produced by a wet method, for example, any method selected from an aggregation and coalescence method, a suspension polymerization method, and a dissolution suspension method. The production method is not limited, and a known production method is employed. Among these methods, an aggregation and coalescence method may be employed to produce powder particles because the volume particle size distribution index and the average circularity may easily be controlled.

Specifically, the powder particles may be produced through the following steps:

a step (aggregated particle forming step) of forming aggregated particles containing resin particles by causing resin particles containing a thermosetting resin and a thermosetting agent to aggregate in a dispersion of the resin particles; and a step (fusion and coalescence step) of fusing and coalescing the aggregated particles by heating an aggregated particle dispersion in which the aggregated particles are dispersed.

When powder particles having a core shell structure are formed, the powder particles may be specifically produced through the following steps:

a step (first aggregated particle forming step) of forming first aggregated particles containing resin particles by causing resin particles containing a thermosetting resin and a thermosetting agent to aggregate in a dispersion of the resin particles;

a step (second aggregated particle forming step) of forming second aggregated particles by mixing a first aggregated particle dispersion in which the first aggregated particles are dispersed and a resin particle dispersion in which the resin particles are dispersed, causing aggregation such that the resin particles are attached to the surfaces of the first aggregated particles; and a step (fusion and coalescence step) of fusing and coalescing the second aggregated particles by heating a second aggregated particle dispersion in which the second aggregated particles are dispersed.

Each step will be described below in detail. The following description provides a method for producing powder particles containing a colorant, but a colorant is not necessarily added.

Dispersion Preparing Step

First, each dispersion for use in an aggregation and coalescence method is prepared. A resin particle dispersion is prepared, for example, by dispersing a mixture of a thermosetting resin and a thermosetting agent in a dispersion medium. Otherwise, resin particles are prepared, for example, by mixing a dispersion of thermosetting resin particles and a dispersion of a thermosetting agent and causing aggregation of the thermosetting resin particles and the thermosetting agent.

Examples of the dispersion medium used for preparing the resin particle dispersion include an aqueous medium. Examples of the aqueous medium include water such as distilled water and ion exchanged water, and alcohols. These aqueous media may be used alone or in combination of two or more.

Examples of a method for dispersing the resin particles in a dispersion medium include ordinary dispersion methods using a rotary shear homogenizer, a ball mill having a media, a sand mill, and Dyno-Mill. The resin particles may be dispersed in a dispersion medium, for example, by a phase-inversion emulsification method depending on the type of resin particles. The phase inversion emulsification method is a method for dispersing a resin in an aqueous medium as particles. This method involves dissolving a target resin in a hydrophobic organic solvent capable of dissolving the resin; adding a base to an organic continuous phase (O phase) to cause neutralization; and adding an aqueous medium (W phase) to convert the resin from W/O to O/W (so-called phase inversion), forming a discontinuous phase.

In the case of a polyester resin, a resin particle dispersion in which polyester resin particles are dispersed is obtained, for example, by thermally melting monomers for forming a polyester resin, causing polycondensation under a reduced pressure, adding a solvent (e.g., ethyl acetate) to the obtained polycondensate, and further adding a weak alkaline aqueous solution under stirring to cause phase-inversion emulsification.

In the case of a (meth)acrylic resin, a resin particle dispersion in which (meth)acrylic resin particles are dispersed is obtained, for example, by emulsifying, in an aqueous medium, monomers for forming a polyester resin, adding a water-soluble initiator and a chain transfer agent, and heating the mixture to induce emulsion polymerization.

A surfactant may be added to the resin particle dispersion from the viewpoint of the dispersion stability of the resin particles. Examples of the surfactant include the anionic surfactants, the cationic surfactants, and the nonionic surfactants described above. These surfactants may be used alone or in combination of two or more. The amount of the surfactant added to the resin particle dispersion may be 0.1% by mass or more and 0.7% by mass or less relative to the resin solids content in the dispersion. The amount of the surfactant in the powder particles may be controlled by the type and amount of the surfactant in the resin particle dispersion.

The amount of the resin particles in the resin particle dispersion is preferably, for example, 5% by mass or more and 50% by mass or less, and more preferably 10% by mass or more and 40% by mass or less.

The volume-average particle size of the resin particles dispersed in the resin particle dispersion is preferably 0.01 µm or more and 1 µm or less, more preferably 0.08 µm or more and 0.8 µm or less, and still more preferably 0.1 µm or more and 0.6 µm or less.

The volume-average particle size of the resin particles in the resin particle dispersion is obtained from the particle size distribution measured with a laser diffraction-type particle size distribution measuring device (e.g., LA-700, available from Horiba Ltd). Specifically, the volume cumulative distribution is drawn from the smaller particle size side for divided particle size regions (channels), and the particle size at 50% of the cumulative particle volume is defined as a volume-average particle size D50v. The volume-average particle size of the particles in other dispersions is similarly determined.

A colorant dispersion is prepared by a method similar to the method for preparing a resin particle dispersion. Specifically, the colorant dispersion has the same dispersion medium, the same surfactant, the same particle content, and the same volume-average particle size of particles as the colorant dispersion. The colorant dispersion is produced by the same method as that for the resin particle dispersion.

Aggregated Particle Forming Step

A resin particle dispersion in which resin particles are dispersed and a colorant dispersion are mixed with each other. In a mixture dispersion, the resin particles and the colorant cause hetero-aggregation to form aggregated particles having a diameter close to the intended powder particle size.

Specifically, aggregated particles are formed, for example, as follows: adding a flocculant to the mixture dispersion and adjusting the pH of the mixture dispersion to the acidic side (e.g., pH 2 to pH 5), and heating the mixture dispersion to a temperature close to the glass transition temperature of the resin contained in the resin particles (specifically, heating to, for example, the glass transition temperature of the resin minus 30° C. or higher and the glass transition temperature minus 10° C. or lower) to cause aggregation of particles dispersed in the mixture dispersion.

The aggregated particle forming step may involve, for example, adding a flocculant to the mixture dispersion at room temperature (e.g., 25° C.) under stirring with a rotary shear-type homogenizer and adjusting the pH of the mixture dispersion to the acidic side (e.g., pH 2 to pH 5) followed by heating.

After adjusting the pH of the mixture dispersion to the acidic side, a surfactant may be added to the mixture dispersion from the viewpoint of the dispersion stability of the aggregated particles. Examples of the surfactant include the anionic surfactants, the cationic surfactants, and the nonionic surfactants described above. These surfactants may be used alone or in combination of two or more. The amount of the surfactant added to the mixture dispersion may be 0.1% by mass or more and 1% by mass or less relative to the resin solids content in the dispersion. The amount of the surfactant in the powder particles may be controlled by the type and amount of the surfactant in the resin particle dispersion.

Examples of the flocculant include surfactants having polarity opposite to the polarity of the surfactant in the mixture dispersion, metal salts, inorganic metal salt polymers, and metal complexes. The use of a metal complex as a flocculant reduces the amount of the surfactant used and improves charging characteristics.

A metal salt, an inorganic metal salt polymer, or a metal complex used as a flocculant serves as a metal ion source in the powder coating material. Examples of the metal salt, the inorganic metal salt polymer, and the metal complex include those described above.

After completion of aggregation, a chelating agent for forming a complex or a similar bond with metal ions contained in the flocculant may be added as desired. If an excessive amount of the flocculant is added, addition of the chelating agent controls the amount of metal ions in the powder particles.

Examples of the chelating agent include water-soluble chelating agents. Specific examples of the chelating agent include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA). The amount of the chelating agent is preferably, for example, 0.01 parts by mass or more and 5.0 parts by mass or less and more preferably 0.1 parts by mass or more and 3.0 parts by mass or less per 100 parts by mass of the resin particles.

To form powder particles having a core shell structure, a first aggregated particle dispersion in which the first aggregated particles are dispersed is obtained, and the first aggregated particle dispersion is then mixed with a resin particle dispersion to cause aggregation such that the resin particles are attached to the surfaces of the first aggregated particles, forming second aggregated particles.

Fusion and Coalescence Step

An aggregated particle dispersion in which aggregated particles are dispersed is heated to fuse and coalesce the aggregated particles, forming powder particles. In this process, the aggregated particles are fused and coalesced by heating the aggregated particle dispersion until the liquid temperature reaches a temperature equal to or higher than the glass transition temperature of the thermosetting resin contained in the resin particles, for example, a temperature that is 5° C. to 30° C. higher than the glass transition temperature.

The powder particles are obtained through the above-described steps.

After completion of the fusion and coalescence step, the powder particles formed in the dispersion is subjected to a known washing step, a known solid liquid separation step, and a known drying step to obtain dried powder particles. The washing step may involve performing sufficient displacement washing with exchanged water from the viewpoint of electrostatic properties. The amount of the surfactant in the powder particles may be controlled by the number of times of displacement washing. The solid liquid separation step may involve performing, for example, suction filtration or pressure filtration from the viewpoint of productivity. The drying step may involve performing, for example, freeze drying, flush drying, fluidized bed drying, or vibratory fluidized bed drying from the viewpoint of productivity.

The powder coating material according to the exemplary embodiment is produced by, as desired, adding an external additive to the obtained dried powder particles, followed by mixing. Mixing is performed with, for example, a V blender, a Henschel mixer, or a Lodge mixer. In addition, coarse particles in the powder coating material may be removed with, for example, a vibration screening machine, a wind-power screening machine, or the particle size distribution may be narrowed.

The powder coating material according to the exemplary embodiment is applied by a known powder coating technique, such as electrostatic coating or fluidized bed dipping.

Coated Product and Method for Producing Coated Product

A coated product according to an exemplary embodiment is a product coated with the powder coating material according to the exemplary embodiment. A method for producing the coated product according to the exemplary embodiment is a method for producing a coated product by coating with the powder coating material according to the exemplary embodiment.

Specifically, a coated product is obtained by applying the powder coating material to the surface of an object to be coated and then performing heating (baking) to cure the powder coating material and thus to form a coating film. Application and heating (baking) of the powder coating material may be carried out sequentially or in one process. A method for applying the powder coating material to the surface of an object to be coated may be a known coating method, such as electrostatic coating or fluidized bed dipping.

The heating temperature during baking (baking temperature) is preferably 90° C. or higher and 250° C. or lower, more preferably 100° C. or higher and 220° C. or lower, still more preferably 100° C. or higher and 200° C. or lower, and yet still more preferably 120° C. or higher and 200° C. or lower. The heating time during baking (baking time) is controlled according to the heating temperature (baking temperature).

The thickness of the coating film formed of the powder coating material is, for example, about 10 μm or more and about 120 μm or less, preferably about 30 μm or more and about 100 μm or less, and more preferably about 60 μm or more and about 90 μm or less.

A target object to be coated with the powder coating material is not limited. Examples of the target object include various metal parts, ceramic parts, and resin parts. These target objects may be non-formed objects before being formed into objects, such as plate-shaped objects and line-shaped objects, or may be formed objects to be used for electronic components, road vehicles, and building interior and exterior materials. The target object may be an object in which the surface to be coated is pretreated with, for example, priming, plating, or electrodeposition.

EXAMPLES

Exemplary embodiments of the present invention will be described below in detail by way of Examples, but exemplary embodiments of the present invention are not limited to these Examples. In the following description, the unit "part" is on a mass basis, unless otherwise specified.

Preparation of Dispersion

Preparation of Colorant Dispersion C1

| | |
|---|---|
| Cyan pigment (C.I. Pigment Blue 15:3 (copper phthalocyanine), electrophotographic grade, Dainichiseika Colour & Chemicals Mfg. Co., Ltd.): | 150 parts |
| Anionic surfactant (sodium dodecylbenzenesulfonate, Neogen RK, DKS Co. Ltd.): | 20 parts |
| Ion exchanged water: | 350 parts |

These materials are mixed and dispersed for 1 hour with high-pressure impact type disperser Ultimizer (HJP 30006, available from Sugino Machine Limited). The solids content is adjusted to 25% by mass by addition of ion exchanged water to obtain a colorant dispersion C1. The volume-average particle size of the cyan pigment in the colorant dispersion C1 is 130 nm.

Preparation of Colorant Dispersion W1

| | |
|---|---|
| Titanium oxide (CR-60, Ishihara Sangyo Kaisha, Ltd.): | 200 parts |
| Anionic surfactant (sodium dodecylbenzenesulfonate, Neogen RK, DKS Co. Ltd.): | 10 parts |
| Ion exchanged water: | 300 parts |
| 1.0% (by mass) aqueous solution of nitric acid: | 15 parts |

These materials and 600 parts of alumina beads 3 mm in diameter (AS ONE Corporation) are placed in a 1000 mL bottle (Aiboy, AS ONE Corporation) and mixed at a number of rotation of 150 rpm with a desktop ball mill for 24 hours. The solids content of the mixture is adjusted to 25% by mass by addition of ion exchanged water to obtain a colorant dispersion W1. The volume-average particle size of the titanium oxide pigment in the colorant dispersion W1 is 350 nm.

Preparation of Resin Particle Dispersion LTX1

| | |
|---|---|
| Terephthalic acid: | 30 parts by mole |
| Dodecenylsuccinic anhydride: | 20 parts by mole |
| 2-Mol-propylene-oxide adduct of Bisphenol A: | 50 parts by mole |

These materials are placed in a reactor equipped with a stirrer, a thermometer, a nitrogen gas inlet, and a fractionating column. The mixture is heated under stirring in a nitrogen atmosphere to 240° C. to cause a polycondensation reaction, forming a polyester resin (1). The weight-average molecular weight of the polyester resin (1) is 20,000.

A jacketed 3 L reaction vessel (BJ-30N, available from Tokyo Rikakikai Co., Ltd.) equipped with a condenser, a thermometer, a dropping device, and an anchor blade is maintained at 40° C. in a water-circulation thermostatic bath. In this reaction vessel, a solvent mixture of 300 parts ethyl acetate and 30 parts isopropyl alcohol is placed, and the following materials are further placed.

| | |
|---|---|
| Polyester resin (1): | 240 parts |
| Thermosetting agent (blocked isocyanate curing agent VESTAGON B 1530 (Evonik industries)): | 60 parts |
| Antifoaming agent (benzoin): | 1.5 parts |
| Surface conditioner (acrylic oligomer (Acronal 4F, BASF SE)): | 3 parts |

After these materials are placed in the reaction vessel, the mixture is stirred with a three-one motor at a number of rotation of 150 rpm so that the materials are dissolved to obtain an oil phase. To the oil phase being stirred, 30 parts of a 10% (by mass) aqueous solution of ammonia is added dropwise for 5 minutes and mixed for 10 minutes. To the mixture, 900 parts of ion exchanged water is added dropwise at a rate of 5 parts per minute to cause phase inversion, forming an emulsion.

Immediately after this, 800 parts of the obtained emulsion and 700 parts of ion exchanged water are added to a 2 L recovery flask, and the recovery flask is set in an evaporator (available from Tokyo Rikakikai Co., Ltd.) equipped with a vacuum control unit via an anti-splash trap. The recovery flask is heated in a hot water bath at 60° C. while being rotated and is depressurized to 7 kPa to remove the solvent while giving consideration to bumping. At a time when the amount of the solvent recovered reaches 1100 parts, the pressure is returned to a normal pressure and the recovery flask is cooled with water to form a dispersion of resin particles containing the polyester resin (1) and the thermosetting agent. The obtained dispersion had no solvent odor.

Subsequently, an anionic surfactant (sodium dodecylbenzenesulfonate, TAYCA POWER BN2060, available from TAYCA Corporation) is added as an active ingredient in an amount of 0.2% by mass relative to the resin solids content in the dispersion, and the solids content is adjusted to 25% by mass by addition of ion exchanged water. The resultant dispersion is provided as a resin particle dispersion LTX1. The volume-average particle size of the resin particles in the resin particle dispersion LTX1 is 145 nm.

Preparation of Resin Particle Dispersion LTX2

A resin particle dispersion LTX2 is prepared in the same manner as for the preparation of the resin particle dispersion LTX1 except that the anionic surfactant (TAYCA POWER BN2060) in the preparation of the resin particle dispersion LTX1 is replaced with a nonionic surfactant (polyoxyethylene lauryl ether, Emulgen 147, available from Kao Corporation), and the nonionic surfactant is added as an active ingredient in an amount of 0.2% by mass relative to the resin solids content in the dispersion. The volume-average particle size of the resin particles in the resin particle dispersion LTX2 is 145 nm.

Preparation of Resin Particle Dispersion LTX3

A resin particle dispersion LTX3 is prepared in the same manner as for the preparation of the resin particle dispersion LTX1 except that the anionic surfactant (TAYCA POWER BN2060) in the preparation of the resin particle dispersion LTX1 is replaced with a cationic surfactant (alkyl benzylammonium salt, Texnol R5, available from Nippon nyukazai Co., Ltd.), and the cationic surfactant is added as an active ingredient in an amount of 0.2% by mass relative to the resin solids content in the dispersion. The volume-average particle size of the resin particles in the resin particle dispersion LTX3 is 145 nm.

Example 1

Production of Blue Powder Coating Material C1

Aggregation Step

| | |
|---|---|
| Resin particle dispersion LTX1: | 160 parts (40 parts of solids) |
| Colorant dispersion W1: | 160 parts (40 parts of solids) |
| Colorant dispersion C1: | 8 parts (2 parts of solids) |
| Ion exchanged water: | 200 parts |

These materials are mixed and dispersed in a round stainless steel flask by using a homogenizer (ULTRA-TURRAX T50, IKA Japan K.K.). Next, the pH is adjusted to 3.5 by using a 1.0% (by mass) aqueous solution of nitric acid. To the resultant dispersion, 12 parts of a 1% (by mass) aqueous solution of polyaluminum chloride is added, and the dispersion process is continued with the homogenizer.

A stirrer and a mantle heater are installed, and the slurry is heated at 0.2° C. per minute while the number of rotation of the stirrer is controlled so as to stir the slurry well. When the volume-average particle size reaches 5.0 μm, 32 parts of the resin particle dispersion LTX1 (8 parts of solids) is added slowly.

After holding for 30 minutes after addition, ethylenediaminetetraacetic acid (EDTA) (CHELEST 40, Chelest Corporation) is added in an amount of 1.5% by mass relative to the resin solids content. Next, the pH is adjusted to 8.5 by using a 5% (by mass) aqueous solution of sodium hydroxide. Furthermore, an anionic surfactant (sodium dodecylbenzenesulfonate, TAYCA POWER BN2060, available TAYCA Corporation) is added as an active ingredient in an amount of 0.2% by mass relative to the resin solids content.

Fusion and Coalescence Step

Subsequently, the liquid temperature is increased to 70° C. and maintained at 70° C. for 2 hours. The particles in the dispersion are found to have a substantially spherical shape through an optical microscope.

Filtering Step, Washing Step, Drying Step

After completion of the fusion and coalescence step, the dispersion in the flask is cooled and filtered to obtain solids. Next, the solids are washed well with ion exchanged water and then subjected to solid-liquid separation through Nutsche-type suction filtration to obtain solids again. Next, the obtained solids are redispersed in 3 L of ion exchanged water at 40° C. and washed by stirring at a number of rotation of 300 rpm for 15 minutes. This washing process is repeated 4 times, and the solids obtained by solid-liquid separation through Nutsche-type suction filtration are vacuum-dried for 12 hours. The dried solids are provided as blue powder particles C1. The volume-average particle size D50v of the blue powder particles C1 is 6.1 μm. The amount (on a mass basis, ppm) of the surfactant in the blue powder particles C1 is determined by the method described above.

Addition of External Additive

The following materials are mixed by stirring with a sample mill (SK-M10, Kyoritsu Riko K.K.) at a number of rotation of 13000 rpm for 30 seconds: 100 parts of the blue powder particles C1; and 0.5 parts of hydrophobic silica particles (RX300, hydrophobic fumed silica with the surfaces modified with hexamethyldisilazane, Nippon Aerosil Co., Ltd.) serving as an external additive. Subsequently, the mixture is screened through a vibrating screen with a 200 mesh (mesh size 45 μm) to obtain a blue powder coating material C1.

Example 2

Production of Blue Powder Coating Material C2

A blue powder coating material C2 is produced in the same manner as in Example 1 except that the number of times of washing is changed to 3.

Example 3

Production of Blue Powder Coating Material C3

A blue powder coating material C3 is produced in the same manner as in Example 1 except that the number of times of washing is changed to 2.

Comparative Example 1

Production of Blue Powder Coating Material XC1

A blue powder coating material XC1 is produced in the same manner as in Example 1 except that the number of times of washing is changed to 7.

Comparative Example 2

Production of Blue Powder Coating Material XC2

A blue powder coating material XC2 is produced in the same manner as in Example 1 except that the number of times of washing is changed to 1.

Example 4

Production of Blue Powder Coating Material C4

Aggregation Step

| | |
|---|---|
| Resin particle dispersion LTX2: | 160 parts (40 parts of solids) |
| Colorant dispersion W1: | 160 parts (40 parts of solids) |
| Colorant dispersion C1: | 8 parts (2 parts of solids) |
| Ion exchanged water: | 200 parts |

These materials are mixed and dispersed in a round stainless steel flask by using a homogenizer (ULTRA-TURRAX T50, IKA Japan K.K.). Next, the pH is adjusted to 3.5 by using a 1.0% (by mass) aqueous solution of nitric acid. To the resultant dispersion, 12 parts of a 1% (by mass) aqueous solution of polyaluminum chloride is added, and the dispersion process is continued with the homogenizer.

A stirrer and a mantle heater are installed, and the slurry is heated at 0.2° C. per minute while the number of rotation of the stirrer is controlled so as to stir the slurry well. When the volume-average particle size reaches 5.0 μm, 32 parts of the resin particle dispersion LTX2 (8 parts of solids) is added slowly.

After holding for 30 minutes after addition, ethylenediaminetetraacetic acid (EDTA) (CHELEST 40, Chelest Corporation) is added in an amount of 1.5% by mass relative to the resin solids content. Next, the pH is adjusted to 8.5 by using a 5% (by mass) aqueous solution of sodium hydroxide. Furthermore, a nonionic surfactant (polyoxyethylene lauryl ether, Emulgen 147, available from Kao Corporation) is added as an active ingredient in an amount of 0.5% by mass relative to the resin solids content.

Fusion and Coalescence Step

Subsequently, the liquid temperature is increased to 70° C. and maintained at 70° C. for 2 hours. The particles in the dispersion are found to have a substantially spherical shape through an optical microscope.

Filtering Step, Washing Step, Drying Step

After completion of the fusion and coalescence step, the dispersion in the flask is cooled and filtered to obtain solids. Next, the solids are washed well with ion exchanged water and then subjected to solid-liquid separation through Nutsche-type suction filtration to obtain solids again. Next, the obtained solids are redispersed in 3 L of ion exchanged water at 40° C. and washed by stirring at a number of rotation of 300 rpm for 15 minutes. This washing process is repeated 5 times, and the solids obtained by solid-liquid separation through Nutsche-type suction filtration are vacuum-dried for 12 hours. The dried solids are provided as blue powder particles C4. The volume-average particle size D50v of the blue powder particles C4 is 6.1 μm. The amount (on a mass basis, ppm) of the surfactant in the blue powder particles C4 is determined by the method described above.

Addition of External Additive

The following materials are mixed by stirring with a sample mill (SK-M10, Kyoritsu Riko K.K.) at a number of rotation of 13000 rpm for 30 seconds: 100 parts of the blue powder particles C4; and 0.5 parts of hydrophobic silica particles (RX300, hydrophobic fumed silica with the surfaces modified with hexamethyldisilazane, Nippon Aerosil Co., Ltd.) serving as an external additive. Subsequently, the mixture is screened through a vibrating screen with a 200 mesh (mesh size 45 μm) to obtain a blue powder coating material C4.

Example 5

Production of Blue Powder Coating Material C5

A blue powder coating material C5 is produced in the same manner as in Example 4 except that the number of times of washing is changed to 3.

Example 6

Production of Blue Powder Coating Material C6

A blue powder coating material C6 is produced in the same manner as in Example 4 except that the number of times of washing is changed to 2.

Comparative Example 3

Production of Blue Powder Coating Material XC3

A blue powder coating material XC3 is produced in the same manner as in Example 4 except that the number of times of washing is changed to 7.

Comparative Example 4

Production of Blue Powder Coating Material XC4

A blue powder coating material XC4 is produced in the same manner as in Example 4 except that the number of times of washing is changed to 1.

Example 7

Production of Blue Powder Coating Material C7

Aggregation Step

| | |
|---|---|
| Resin particle dispersion LTX3: | 160 parts (40 parts of solids) |
| Colorant dispersion W1: | 160 parts (40 parts of solids) |
| Colorant dispersion C1: | 8 parts (2 parts of solids) |
| Ion exchanged water: | 200 parts |

These materials are mixed and dispersed in a round stainless steel flask by using a homogenizer (ULTRA-TURRAX T50, IKA Japan K.K.). Next, the pH is adjusted to 3.5 by using a 1.0% (by mass) aqueous solution of nitric acid. To the resultant dispersion, 12 parts of a 1% (by mass) aqueous solution of polyaluminum chloride is added, and the dispersion process is continued with the homogenizer.

A stirrer and a mantle heater are installed, and the slurry is heated at 0.2° C. per minute while the number of rotation of the stirrer is controlled so as to stir the slurry well. When the volume-average particle size reaches 5.0 μm, 32 parts of the resin particle dispersion LTX3 (8 parts of solids) is added slowly.

After holding for 30 minutes after addition, ethylenediaminetetraacetic acid (EDTA) (CHELEST 40, Chelest Corporation) is added in an amount of 1.5% by mass relative to the resin solids content. Next, the pH is adjusted to 8.5 by using a 5% (by mass) aqueous solution of sodium hydroxide. Furthermore, a cationic surfactant (stearyl trimethyl ammonium chloride, QUARTAMIN 86P, available from Kao Corporation) is added as an active ingredient in an amount of 0.7% by mass relative to the resin solids content.

Fusion and Coalescence Step

Subsequently, the liquid temperature is increased to 70° C. and maintained at 70° C. for 2 hours. The particles in the dispersion are found to have a substantially spherical shape through an optical microscope.

Filtering Step, Washing Step, Drying Step

After completion of the fusion and coalescence step, the dispersion in the flask is cooled and filtered to obtain solids. Next, the solids are washed well with ion exchanged water and then subjected to solid-liquid separation through Nutsche-type suction filtration to obtain solids again. Next, the obtained solids are redispersed in 3 L of ion exchanged water at 40° C. and washed by stirring at a number of rotation of 300 rpm for 15 minutes. This washing process is repeated 4 times, and the solids obtained by solid-liquid separation through Nutsche-type suction filtration are vacuum-dried for 12 hours. The dried solids are provided as blue powder particles C7. The volume-average particle size D50v of the blue powder particles C7 is 6.1 μm. The amount (on a mass basis, ppm) of the surfactant in the blue powder particles C7 is determined by the method described above.

Addition of External Additive

The following materials are mixed by stirring with a sample mill (SK-M10, Kyoritsu Riko K.K.) at a number of rotation of 13000 rpm for 30 seconds: 100 parts of the blue powder particles C7; and 0.5 parts of hydrophobic silica particles (RX300, hydrophobic fumed silica with the surfaces modified with hexamethyldisilazane, Nippon Aerosil Co., Ltd.) serving as an external additive. Subsequently, the mixture is screened through a vibrating screen with a 200 mesh (mesh size 45 μm) to obtain a blue powder coating material C7.

Example 8

Production of Blue Powder Coating Material C8

A blue powder coating material C8 is produced in the same manner as in Example 7 except that the number of times of washing is changed to 3.

Example 9

Production of Blue Powder Coating Material C9

A blue powder coating material C9 is produced in the same manner as in Example 7 except that the number of times of washing is changed to 2.

Comparative Example 5

Production of Blue Powder Coating Material XC5

A blue powder coating material XC5 is produced in the same manner as in Example 7 except that the number of times of washing is changed to 7.

Comparative Example 6

Production of Blue Powder Coating Material XC6

A blue powder coating material XC6 is produced in the same manner as in Example 7 except that the number of times of washing is changed to 1.

Evaluation

Heat-Resistant Storage Stability of Powder Coating Material

The powder coating material is stored for 17 hours in a constant temperature and humidity chamber in which the temperature is controlled at 50° C. and the relative humidity is controlled at 50%. The powder coating material is then screened through a vibrating screen with a 200 mesh (mesh size 45 μm). The amount of undersize material is determined and classified based on the following criteria. The symbol A indicates an acceptable range.

A: The amount of undersize material is 90% by mass or more.

NA: The amount of undersize material is less than 90% by mass.

Minimum Thickness at which Recess Formed

The powder coating material is applied to a test panel (30 cm×30 cm) formed of a mirror-finished aluminum plate by using a corona gun (XR4-110C, Asahi Sunac Corporation) at a 30-cm distance from the front face. The coated object is placed in a chamber controlled at 180° C. and heated (baked) for 30 minutes to obtain a coated sample. Coated samples are produced in post-baked thickness increments of 5 μm from 40 μm. The surfaces (30 cm×30 cm) of the coated samples are observed to investigate the minimum thickness at which a recess is formed.

TABLE 1

| | Blue Powder Coating Material | D50v Of Powder Particles (μm) | Resin Particle Dispersion | | | Amount of Surfactant in Powder Particles (ppm) | Heat-Resistant Storage Stability | Minimum Thickness at Which Recess is Formed (μm) |
|---|---|---|---|---|---|---|---|---|
| | | | LTX1 | LTX2 | LTX3 | | | |
| Example 1 | C1 | 6.1 | X | — | — | 0.15 | A | 75 |
| Example 2 | C2 | 6.0 | X | — | — | 4.00 | A | 80 |
| Example 3 | C3 | 6.1 | X | — | — | 8.00 | A | 85 |
| Comparative Example 1 | XC1 | 6.2 | X | — | — | 0.05 | A | 55 |
| Comparative Example 2 | XC2 | 6.1 | X | — | — | 8.05 | NA | 80 |
| Example 4 | C4 | 6.1 | — | X | — | 0.15 | A | 80 |
| Example 5 | C5 | 5.8 | — | X | — | 4.00 | A | 80 |
| Example 6 | C6 | 5.9 | — | X | — | 8.00 | A | 85 |
| Comparative Example 3 | XC3 | 6.2 | — | X | — | 0.05 | A | 55 |

TABLE 1-continued

| | Blue Powder Coating Material | D50v Of Powder Particles (μm) | Resin Particle Dispersion | | | Amount of Surfactant in Powder Particles (ppm) | Heat-Resistant Storage Stability | Minimum Thickness at Which Recess is Formed (μm) |
|---|---|---|---|---|---|---|---|---|
| | | | LTX1 | LTX2 | LTX3 | | | |
| Comparative Example 4 | XC4 | 6.2 | — | X | — | 8.05 | NA | 85 |
| Example 7 | C7 | 6.1 | — | — | X | 0.15 | A | 70 |
| Example 8 | C8 | 5.9 | — | — | X | 4.00 | A | 75 |
| Example 9 | C9 | 5.8 | — | — | X | 8.00 | A | 80 |
| Comparative Example 5 | XC5 | 6.2 | — | — | X | 0.05 | A | 45 |
| Comparative Example 6 | XC6 | 6.1 | — | — | X | 8.05 | NA | 75 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material comprising:
powder particles containing a thermosetting resin, a thermosetting agent, and a surfactant,
wherein an amount of the surfactant is about 0.1 ppm or more and about 8.0 ppm or less on a mass basis.

2. The thermosetting powder coating material according to claim 1, wherein the thermosetting resin contains a thermosetting polyester resin.

3. The thermosetting powder coating material according to claim 2, wherein a sum of an acid value and a hydroxyl value of the thermosetting polyester resin is about 10 mg KOH/g or more and about 250 mg KOH/g or less.

4. The thermosetting powder coating material according to claim 3, wherein the thermosetting polyester resin has a number-average molecular weight of about 1,000 or more and about 100,000 or less.

5. The thermosetting powder coating material according to claim 2, wherein the thermosetting polyester resin has a glass transition temperature (Tg) of about 60° C. or lower.

6. The thermosetting powder coating material according to claim 1, wherein the thermosetting resin contains a thermosetting (meth)acrylic resin.

7. The thermosetting powder coating material according to claim 6, wherein the thermosetting (meth)acrylic resin has a number-average molecular weight of about 1,000 or more and about 20,000 or less.

8. The thermosetting powder coating material according to claim 6, wherein the thermosetting (meth)acrylic resin has a glass transition temperature (Tg) of about 60° C. or lower.

9. The thermosetting powder coating material according to claim 1, wherein the surfactant contains at least one selected from the group consisting of anionic surfactants and nonionic surfactants.

10. The thermosetting powder coating material according to claim 1, wherein an amount of the thermosetting agent is about 1% by mass or more and about 30% by mass or less relative to an amount of the thermosetting resin.

11. The thermosetting powder coating material according to claim 1, wherein the thermosetting powder coating material is free of a colorant.

12. The thermosetting powder coating material according to claim 1, wherein the thermosetting powder coating material contains a metal element capable of having a valence of 2 or higher.

13. The thermosetting powder coating material according to claim 12, wherein an amount of the metal element is about 0.002% by mass or more and about 0.2% by mass or less relative to a total amount of the thermosetting powder coating material.

14. The thermosetting powder coating material according to claim 1, further comprising inorganic particles with hydrophobized surfaces.

15. The thermosetting powder coating material according to claim 14, wherein the inorganic particles have a volume-average particle size of about 5 nm or more and about 40 nm or less.

16. The thermosetting powder coating material according to claim 14, wherein an amount of the inorganic particles added is about 0.01% by mass or more and about 5% by mass or less relative to a total amount of the thermosetting powder coating material.

17. The thermosetting powder coating material according to claim 1, wherein a volume particle size distribution index GSDv is about less than 1.20.

18. The thermosetting powder coating material according to claim 1, wherein an average circularity is about 0.96 or more.

19. A coated product having a surface, comprising a coating film formed of the thermosetting powder coating material according to claim 1 on at least part of the surface.

20. The coated product according to claim 19, wherein the coating film has a thickness of about 10 μm or more and about 120 μm or less.

* * * * *